United States Patent [19]

Winter

[11] Patent Number: 5,427,182

[45] Date of Patent: Jun. 27, 1995

[54] PRESSURE RELIEVING CIRCUIT FOR A SERIES CYLINDER DEPTH CONTROL

[75] Inventor: David C. Winter, Johnston, Iowa

[73] Assignee: Deere & Company, Moline, Ill.

[21] Appl. No.: 135,388

[22] Filed: Oct. 8, 1993

[51] Int. Cl.$^6$ .............................................. A01B 63/22
[52] U.S. Cl. ...................................... 172/2; 172/4
[58] Field of Search .................. 74/97, 471, 527, 529; 137/625.63, 625.66; 91/189 R, 404, 520; 172/2, 4, 126, 310, 311, 130, 413, 401, 404, 410

[56] References Cited

U.S. PATENT DOCUMENTS

| | | |
|---|---|---|
| 3,627,053 | 12/1971 | Hook et al. . |
| 4,355,660 | 10/1982 | Huffman .......................... 137/625.63 |
| 4,506,898 | 3/1985 | Herron ............................... 172/401 X |
| 4,546,832 | 10/1985 | Dietrich, Sr. et al. ............ 172/260.5 |
| 4,579,038 | 4/1986 | Winter ................................ 172/4 X |
| 4,700,784 | 10/1987 | Wiebe et al. ........................ 172/126 |
| 4,821,806 | 4/1989 | Winter ..................................... 172/4 |
| 4,967,851 | 11/1990 | Barber . |
| 5,062,316 | 11/1991 | Lykken et al. ........................ 74/529 |

OTHER PUBLICATIONS

Prince Manufacturing Corp., Prince Hydraulics, "Rebound Compensation Valve Model RB45-650", 2 pages, dated Oct. 1992, published in the U.S.A.

*Primary Examiner*—Randolph A. Reese
*Assistant Examiner*—Robert Pezzuto

[57] ABSTRACT

A one-way pressure bleed off path is provided between the series cylinder depth control circuit and an additional hydraulic circuit for an agricultural implement to prevent pressure build-up and hose expansion that otherwise would cause uneven series cylinder extension and uneven implement depth. A line including an orifice and a one-way check valve is added between the depth control circuit and the second circuit, such as the wing fold circuit for the implement, to bleed off any series cylinder pressure build-up through the otherwise unused second circuit. The orifice limits the amount of oil that is returned to reservoir during operation of the series circuit to lower the implement. The check valve isolates the depth control circuit and the second circuit to prevent unwanted cylinder operation while the wings are being folded.

14 Claims, 2 Drawing Sheets

PRESSURE RELIEVING CIRCUIT FOR A SERIES CYLINDER DEPTH CONTROL

BACKGROUND OF THE INVENTION

1) Field of the Invention

The present invention relates generally to depth control systems for agricultural implements, and, more specifically, to an improved series cylinder depth control circuit for wide tillage equipment and the like.

2) Related Art

Series cylinders are used extensively for controlling depth across the width of large agricultural implements such as field cultivators and chisel plows. Since the series cylinders extend and retract in unison, the implement can be raised and lowered in a relatively level fashion, and the working depth of the implement including hinged outer wing sections can be maintained generally uniform. However, several problems with presently available series circuits limit the accuracy of the working depth along the width of the implement.

Series cylinder circuits include cylinders with grooves to rephase the cylinders as they are cycled. The cylinders on the wings downstream of the main frame cylinder often fail to settle back past the rephasing grooves. The main frame cylinder is first to settle since it supports the heaviest load, and, as the main frame settles, the pressures downstream increase, often to a level such that the wing cylinders can support the wings and prevent the desired settling similar to that of the main frame cylinder. The settling problem is aggravated by the increased stand-by pressures on newer tractors.

A second problem is caused by hose expansion. When the machine is lowered to a preselected point determined by a mechanically actuated hydraulic check valve, system pressure in the series circuit increases to the stand-by pressure and causes all the holes to expand. If this stand-by pressure bleeds off through the tractor selective control valve (SCV) or if the implement is raised off the single point stop, the hoses all relax and hydraulic fluid is displaced from the main frame cylinder toward the downstream cylinders. In turn, each downstream cylinder moves from the desired working position, with the movement being cumulative such that each cylinder moves more than the previous cylinder. As a result, depth inaccuracies increase along the width of the implement. These inaccuracies can be as much as one inch or more, which is unacceptable in many field-working applications.

One attempt to reduce depth variations has been to insert a rebound valve, such as the commercially available Prince Model RB-4S-650, in the circuit between the input and output lines leading from the SCV to the series cylinders. The valve limits pressurization of the circuit to a level below full tractor pressure so that depth inaccuracies caused by hose expansion and relaxation is reduced. In addition to being fairly complicated and relatively expansive, rebound valves fail to solve the settling problem.

BRIEF SUMMARY OF THE INVENTION

It is therefore an object of the present invention to provide an improved series cylinder depth control circuit for an agricultural implement. It is a further object to provide such a circuit which overcomes one or more of the above-mentioned problems.

It is a further object of the present invention to provide an improved series cylinder depth control circuit which eliminates settleback inaccuracies and reduces or eliminates cylinder rebound caused by hose expansion. It is yet another object to provide such a circuit which is relatively simple, inexpensive and transparent to the operator. It is still a further object to provide such a circuit which advantageously utilizes existing hydraulic circuitry without interfering with normal operation of the circuitry.

It is still another object of the present invention to provide an improved series cylinder depth control circuit which eliminates settleback inaccuracies as well as cylinder rebound caused by hose expansion when activated and which permits normal cylinder operation when inactivated.

A one-way pressure bleed off path is provided between the series cylinder depth control circuit and an additional hydraulic circuit for an agricultural implement to prevent pressure build-up and hose expansion that otherwise would cause uneven series cylinder extension and uneven implement depth. A line including an orifice and a one-way check valve is added between the depth control circuit and a second circuit, such as the wing fold circuit for the implement, to bleed off any series cylinder pressure build-up through the otherwise unused second circuit. The orifice limits the amount of oil that is returned to reservoir during operation of the series circuit to lower the implement. The check valve isolates the depth control circuit and the second circuit to prevent unwanted cylinder operation while the wings are being folded. In another embodiment of the invention, the second circuit connected to the orifice and check valve is an auxiliary return line direct to sump, which is available in kit form and is typically used for a hydraulic motor drain line to reduce back pressure.

Precise depth control is achieved by elimination of settleback inaccuracy and cylinder rebound due to hose expansion. A single point depth control can be used without sacrificing consistent machine depth. The circuit eliminates the cumulative effect of hose expansion so that mechanical adjustments across the machine will be more consistent. System components are simple, relatively inexpensive, and generally transparent to the operator. The circuit advantageously utilizes features on the tractor and wing fold circuitry that otherwise would be sitting dormant during operation of the machine in the field-working position. If the operator fails to activate the bleed system by placing the wing fold circuit in a float position (or by attaching the circuit to the auxiliary return line), the machine will still function just as it did in the past without negative side effects other than the previous potential for less precise depth control.

These and other objects, features and advantages of the present invention will become apparent to one skilled in the art upon reading the following detailed description in view of the drawings.

DETAILED DESCRIPTION OF THE DRAWINGS

Figure 1:
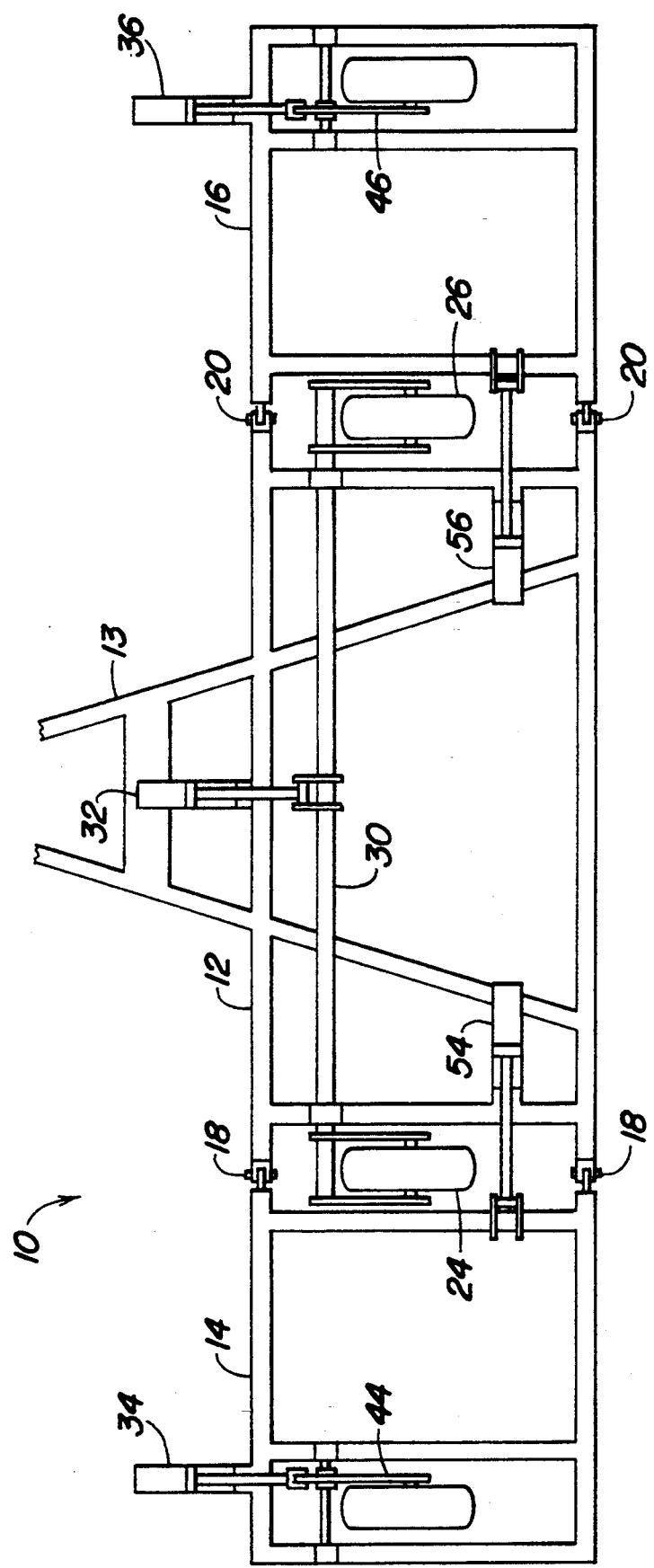
FIG. 1 is a schematic representation of a tillage implement having a series cylinder depth control circuit and a wing fold system.

Referring now to FIG. 1, therein is shown a tillage implement 10 such as a multi-section chisel plow having a main central frame 12 with a hitch 13 adapted for connection to a towing vehicle (not shown) such as a tractor. Outer wing sections 14 and 16 are pivotally connected to the main frame 12 by hinges 18 and 20. The main frame 12 is supported by vertically adjustable wheel assemblies 24 and 26 connected to a rockshaft 30. One or more main frame hydraulic cylinders 32 are connected to rockshaft 30 for rotating the rockshaft about a transverse axis to raise and lower the frame 12 between field-working and transport positions and to adjust the working depth of the implement.

Wing lift cylinders 34 and 36 are connected in series with the main frame cylinder 32. The cylinders 34 and 36 are connected to wing lift wheel assemblies 44 and 46 and are operated with the wheel assemblies 24 and 26 by a hydraulic lift circuit 48 to raise and lower the wing sections 14 and 16 generally in unison with the main frame 12. Wing fold cylinders 54 and 56 connected between the main frame 12 and the wing sections 14 and 16 pivot the wing sections about the axes of the hinges 18 and 20 between lowered field-working positions (shown) and raised transport positions.

Figures 2, 3:
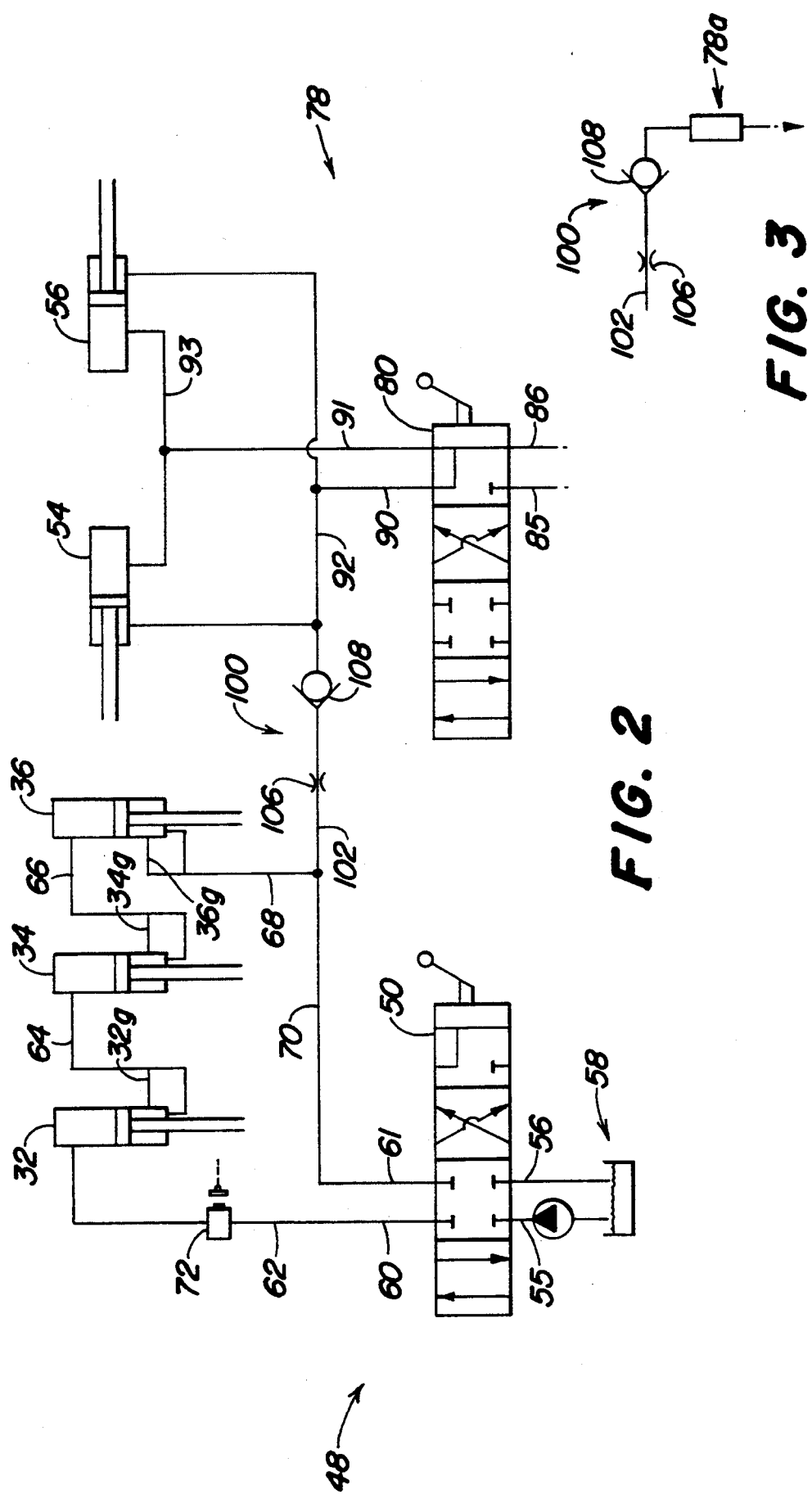
FIG. 2 is a schematic representation of an improved hydraulic circuit with a bleed system for an implement such as shown in FIG. 1.
FIG. 3 is schematic representation of an alternate embodiment of the bleed system.

As best seen in FIG. 2, the hydraulic circuit for the implement 10 includes a main selective control valve (SCV) 50 located in the tractor cab and having input ports 55 and 56 connected to the pressure and return lines of a source of hydraulic fluid under pressure 58 on the tractor. An output port 60 is connected via flexible hose or line 62 to the base end of the main cylinder 32. A flexible hose 64 connects the rod end of the cylinder 32 with the base end of the cylinder 34. A flexible hose 66 connects the rod end of the cylinder 34 with the base end of the cylinder 36, and the rod end of the cylinder 36 is returned via lines 68 and 70 to the output port 61 of the SCV 50. A conventional single point depth control valve 72 responsive to the rocked position of the wheel assemblies 24 and 26 may be provided in the line 62 to limit retraction of the cylinder 32 to set the working depth of the implement while operating in the field.

The SCV 50 has four positions including (as viewed from left to right in FIG. 2) a raise position, a block position, a lower position, and a float position. Moving the valve to the right pressurizes the line 62 and returns the line 70 to reservoir to cause the cylinders to extend to raise the implement 10. The cylinders 32-36 have standard rephasing grooves or lines, indicated generally at 32g-36g, so ideally the cylinders will settle to equalized positions after being fully extended. Moving the valve 50 to the block position maintains the cylinders 32-36 in their given position. By placing the valve 50 in the lower position, the line 70 is connected to the pressure port 55 and the line 62 is returned to reservoir so that the cylinders 32-36 retract to lower the implement toward the field-working position. Once the main frame 12 reaches a preselected position with the single point depth control 72 in operation, the valve 72 closes to block return flow through the line 62 and prevent further retraction of the cylinders.

An auxiliary hydraulic circuit, indicated generally at 78, includes the wing fold cylinders 54 and 56 and provides a folding function for narrowing the implement 10 for transport. The circuit 78 includes an SCV 80 similar in construction and operation to the SCV 50 and connected to the source 58 via pressure port 85 and return port 86. First and second output ports 90 and 91 are connected via lines 92 and 93 to the rod and base ends, respectively, of the cylinders 54 and 56 for operating the cylinders in parallel to fold and unfold the wing sections 14 and 16. With the SCV 80 in the position shown in FIG. 2, the cylinders 54 and 56 are free to float, with both the lines 92 and 93 open to reservoir.

A pressure relief circuit 100 is connected between the auxiliary circuit 78 and the hydraulic lift circuit 48 for preventing settleback inaccuracies during rephasing, and for preventing cylinder rebound caused by hose expansion in the circuit 48. A line 102 including an orifice 106 and a check valve 108 is connected to the lift circuit line 68 and to the base line 92 (the fold side) of the circuit 78. After the implement 10 is unfolded, the SCV 80 is moved to the float position shown in FIG. 2 so that the line 92 is open to reservoir. Any pressure build-up in the depth control lines return lines bleeds off through the orifice 106 and check valve 108 to reservoir thereby providing consistent lower pressures in the lift circuit lines after completion of the lower cycle. In addition, since pressure cannot build up in the lift circuit lines during rephasing, all the cylinders 32-36 settle back to the desired rephasing position after being fully extended. During the lower cycle, the lines 70 and 68 will be pressurized, but the orifice 106 limits the amount of hydraulic fluid that can circulate through the circuit 78 to reservoir from the lift circuit 48. The check valve 108 isolates the fold circuit 78 from the lift circuit 48 to prevent unwanted movement of the lift cylinders 32-36 while the line 92 is pressurized to fold the wings 14 and 16 to the transport position.

In the alternate embodiment of FIG. 3, the auxiliary circuit 78a connected to the orifice 106 and check valve 108 is an auxiliary return line direct to reservoir on the tractor. Preferably, the circuit 78a is a commercially available kit which normally is used with hydraulic motors to prevent back pressure in the motor return line by providing a direct path to reservoir.

Having described the preferred embodiment, it will become apparent that various modifications can be made without departing from the scope of the invention as defined in the accompanying claims.

I claim:

1. In a implement adapted for towing by a vehicle having a source of hydraulic fluid under pressure with a reservoir, the implement having at least first and second framed sections and cylinders for raising and lowering the sections generally in unison, hydraulic lift structure comprising:

a first lift cylinder connected to the first section of the implement;

a second lift cylinder connected to the second section; flexible hydraulic depth control lines connecting the first and second cylinders to the source for operation of the cylinders in series;

an auxiliary hydraulic circuit connected between the source and the implement;

a selective control valve connected between the auxiliary hydraulic circuit and the source of hydraulic fluid under pressure;

an operable depth control valve connected between the selective control valve and the lift cylinders for selectively blocking flow to the depth control cylinders in response to lowering of the implement to a preselected field-working position, the depth control valve when operated causing an increase of pressure in the flexible hydraulic depth control lines; and means for relieving hydraulic pressure in the depth control lines including means connected between the auxiliary hydraulic circuit and the depth control lines for selectively directing a portion of the hydraulic fluid in the flexible lines to the reservoir by way of the auxiliary hydraulic circuit when the pressure increases in the depth control lines.

2. The invention as set forth in claim 1 wherein the means for relieving hydraulic pressure comprises a check valve connected between the auxiliary hydraulic circuit and the depth control lines, the selective control valve including a float position returning the auxiliary hydraulic circuit to reservoir.

3. In a implement adapted for towing by a vehicle having a source of hydraulic fluid under pressure with a reservoir, the implement having at least first and second framed sections and cylinders for raising and lowering the sections generally in unison, hydraulic lift structure comprising:

a first lift cylinder connected to the first section of the implement;

a second lift cylinder connected to the second section;

flexible hydraulic depth control lines connecting the first and second cylinders to the source for operation of the cylinders in series;

an auxiliary hydraulic circuit connected between the source and the implement;

a check valve connected between the auxiliary hydraulic circuit and the depth control lines;

wherein the auxiliary hydraulic circuit includes a selective control valve having a float position, wherein the selective control valve, in the float position, provides a path to the reservoir from the check valve for relieving hydraulic pressure in the depth control lines.

4. The invention as set forth in claim 3 further comprising an orifice connected between the auxiliary hydraulic circuit and the depth control lines for limiting the flow of hydraulic fluid between the circuit and the depth control lines.

5. The invention as set forth in claim 4 wherein the orifice and the check valve are connected in series between the auxiliary hydraulic circuit and the depth control lines.

6. The invention as set forth in claim 3 further comprising a depth control valve connected to the depth control lines for selectively blocking flow from the depth control cylinders to establish an implement working position.

7. In a implement adapted for towing by a vehicle having a source of hydraulic fluid under pressure with a reservoir, the implement having at least first and second framed sections and being foldable to reduce transport width, hydraulic lift structure comprising:

a first lift cylinder connected to the first section of the implement;

a second lift cylinder connected to the second section;

a selective control valve connected to the source;

flexible hydraulic depth control lines connecting the first and second cylinders to the source through the selective control valve for operation of the cylinders in series to control implement depth of operation and to lift the implement to a fully raised transport position;

an auxiliary hydraulic circuit connected between the source and the implement for folding the implement; and a hydraulic pressure relief circuit connected between the auxiliary hydraulic circuit and the depth control lines, the relief circuit including a check valve isolating the auxiliary circuit from the lift cylinders and preventing folding of the implement during implement depth control operation, and a restriction limiting hydraulic fluid flow from the depth control lines to the auxiliary hydraulic circuit during depth control operation, wherein the auxiliary hydraulic circuit includes a substantially direct fluid path to the reservoir for the limited hydraulic fluid flow from the depth control lines.

8. The invention as set forth in claim 7 wherein the auxiliary hydraulic circuit includes a second control valve having input ports connected to the source and output ports, and the relief circuit is connected between the output ports and the selective control valve.

9. The invention as set forth in claim 8 wherein the second control valve includes a float position wherein the output ports are returned to the reservoir to thereby provide the substantially direct fluid flow to the reservoir.

10. The invention as set forth in claim 7 wherein the check valve is connected in series with the restriction.

11. In a implement adapted for towing by a vehicle having a source of hydraulic fluid under pressure with a reservoir, the implement having at least first and second framed sections and being foldable to reduce transport width, hydraulic lift structure comprising:

a first lift cylinder connected to the first section of the implement;

a second lift cylinder connected to the second section;

a selective control valve connected to the source;

flexible hydraulic depth control lines connecting the first and second cylinders to the source through the selective control valve for operation of the cylinders in series to control implement depth of operation and to lift the implement to a fully raised transport position;

an auxiliary hydraulic circuit connected between the source and the implement for folding the implement;

a hydraulic pressure relief circuit connected between the auxiliary hydraulic circuit and the depth control lines, the relief circuit including a check valve isolating the auxiliary circuit from the lift cylinders and preventing folding of the implement during implement depth control operation, and a restriction limiting hydraulic fluid flow from the depth control lines to the auxiliary hydraulic circuit during depth control operation; and wherein the lift cylinders include rephasing lines for equalizing the lift cylinders when the implement is lifted to the fully raised position, the relief circuit limiting maximum pressure in the depth control lines during equalization of the cylinders.

12. The invention as set forth in claim 11 including a depth control valve connected between the selective control valve and the lift cylinders for selectively blocking flow to the depth control cylinders in response to lowering of the implement to a preselected field-working position, wherein the relief circuit limits maximum pressure in the depth control lines upon blocking of the flow.

13. In a implement adapted for towing by a vehicle having a source of hydraulic fluid under pressure with a reservoir, the implement having at least first and second framed sections and being foldable to reduce transport width, hydraulic structure comprising:
   a first lift cylinder connected to the first section of the implement and having a base side;
   a second lift cylinder connected to the second section;
   a selective control valve connected to the source;
   flexible hydraulic depth control lines connecting the first and second cylinders to the source through the selective control valve for operation of the cylinders in series to control implement depth of operation and to lift the implement to a fully raised transport position;
   an auxiliary hydraulic circuit connected between the source and the implement for folding the implement; and
   a hydraulic pressure relief circuit connected between the auxiliary hydraulic circuit and the depth control lines, the relief circuit including a check valve isolating the auxiliary circuit from the lift cylinders and preventing folding of the implement during implement depth control operation, and a restriction limiting hydraulic fluid flow from the depth control lines to the auxiliary hydraulic circuit during depth control operation;
   a depth control valve connected between the selective control valve and the lift cylinders for selectively blocking flow to the depth control cylinders in response to lowering of the implement to a preselected field-working position, wherein the relief circuit limits maximum pressure in the depth control lines upon blocking of the flow; and
   wherein the selective control valve has a raise position for pressurizing the base side of the first cylinder and returning the second cylinder to the reservoir and a lower position for returning the base side of the first cylinder to the reservoir, and wherein the depth control valve is connected to the base side of the first cylinder.

14. The invention as set forth in claim 13 wherein the relief circuit is connected to the return line of the second cylinder.

* * * * *